(12) United States Patent
Hirawaki et al.

(10) Patent No.: US 11,052,581 B2
(45) Date of Patent: Jul. 6, 2021

(54) MOLDING METHOD AND MOLDING SYSTEM FOR RESIN MOLDED MEMBER

(71) Applicants: HONDA MOTOR CO., LTD., Tokyo (JP); SUBARU CORPORATION, Tokyo (JP); SUZUKI MOTOR CORPORATION, Hamamatsu (JP); TOYOTA JIDOSHA KABUSHIKI KAISHA, Toyota (JP); TEIJIN LIMITED, Osaka (JP); Toray Industries, Inc., Tokyo (JP); KYOWA INDUSTRIAL CO., LTD., Sanjo (JP); NATIONAL UNIVERSITY CORPORATION NAGOYA UNIVERSITY, Nagoya (JP)

(72) Inventors: Satoshi Hirawaki, Saitama (JP); Masashi Horikawa, Niigata (JP); Shusuke Sanai, Shizuoka (JP); Kanji Takaoka, Aichi (JP); Kazuaki Amaoka, Aichi (JP); Munehito Kawakami, Tokyo (JP); Kazuki Baba, Tokyo (JP)

(73) Assignees: HONDA MOTOR CO., LTD., Tokyo (JP); SUBARU CORPORATION, Tokyo (JP); SUZUKI MOTOR CORPORATION, Hamamatsu (JP); TOYOTA JIDOSHA KABUSHIKI KAISHA, Aichi (JP); TEIJIN LIMITED, Osaka (JP); TORAY INDUSTRIES, INC., Tokyo (JP); KYOWA INDUSTRIAL CO., LTD., Sanjo (JP); NATIONAL UNIVERSITY CORPORATION, Nagoya (JP)

( * ) Notice: Subject to any disclaimer, the term of this patent is extended or adjusted under 35 U.S.C. 154(b) by 227 days.

(21) Appl. No.: 16/310,008

(22) PCT Filed: May 11, 2017

(86) PCT No.: PCT/JP2017/017893
§ 371 (c)(1),
(2) Date: Dec. 14, 2018

(87) PCT Pub. No.: WO2017/217151
PCT Pub. Date: Dec. 21, 2017

(65) Prior Publication Data
US 2019/0168425 A1    Jun. 6, 2019

(30) Foreign Application Priority Data
Jun. 17, 2016    (JP) .............................. JP2016-120485

(51) Int. Cl.
*B29C 43/58*    (2006.01)
*B29C 43/56*    (2006.01)
(Continued)

(52) U.S. Cl.
CPC ............ *B29C 43/58* (2013.01); *B29C 43/003* (2013.01); *B29C 43/02* (2013.01); *B29C 43/04* (2013.01);
(Continued)

(58) Field of Classification Search
CPC ......... B29C 43/58; B29C 43/56; B29C 43/02; B29C 43/003; B29C 43/04;
(Continued)

(56) References Cited

U.S. PATENT DOCUMENTS 3,504,070 A * 3/1970 Zaharski ................. B29C 51/06
264/549
4,551,085 A * 11/1985 Epel .................... B29C 43/3607
425/405.1
(Continued)

FOREIGN PATENT DOCUMENTS

EP    1844927 A2    10/2007
JP    62-193814 A    8/1987
(Continued)

OTHER PUBLICATIONS

English translation of JP-07256673-A, by EPO (Year: 1995).*

(Continued)

*Primary Examiner* — Leith S Shafi
*Assistant Examiner* — Inja Song
(74) *Attorney, Agent, or Firm* — Rankin, Hill & Clark LLP (57) ABSTRACT

A molding method and a molding system for improving a molding speed of a resin molded member. In the method, firstly a thermoplastic resin composite material is filled in a metal mold (i.e., at time T0), and subsequently a mold-clamping process gets started. As the mold-clamping process progresses, a first decompression circuit starts to decompress an inside of a cavity when the cavity is closed by a sealing member provided on the metal mold. Then, as the mold-clamping process further progresses, the thermoplastic resin composite material thus filled in the metal mold contacts an upper mold of the metal mold (i.e., at time T2). After that, a second decompression circuit starts to decompress the inside of the cavity, thereby to complete the mold-clamping process (i.e., at time T3).

4 Claims, 7 Drawing Sheets (51) Int. Cl.
| | | |
|---|---|---|
| *B29C 43/02* | (2006.01) | |
| *B29C 43/00* | (2006.01) | |
| *B29C 43/04* | (2006.01) | |
| *B29K 307/04* | (2006.01) | |

(52) U.S. Cl.
CPC ...... *B29C 43/56* (2013.01); *B29C 2043/5808* (2013.01); *B29C 2043/5833* (2013.01); *B29K 2307/04* (2013.01)

(58) Field of Classification Search
CPC .... B29C 2043/5808; B29C 2043/5833; B29C 2043/3644; B29C 43/3642; B29C 70/46; B29C 33/10; B29C 33/0038; B29C 33/005; B29C 2043/563; B29K 2307/04; B29K 2105/12; B29K 2101/12; B29L 2031/3055; B29L 2031/3005; B29L 2031/30

See application file for complete search history.

(56) References Cited

U.S. PATENT DOCUMENTS

| | | | |
|---|---|---|---|
| 5,071,603 A | 12/1991 | Kurumaji | |
| 2007/0238378 A1* | 10/2007 | Conover | B32B 5/20 |
| | | | 442/59 |
| 2010/0052217 A1 | 3/2010 | Kasumi | |
| 2014/0061980 A1* | 3/2014 | Kobayashi | B29C 45/561 |
| | | | 264/500 |

FOREIGN PATENT DOCUMENTS

| | | | |
|---|---|---|---|
| JP | 01-258899 A | | 10/1989 |
| JP | 01-266996 A | | 10/1989 |
| JP | 05-060818 U | | 8/1993 |
| JP | 07-088871 A | | 4/1995 |
| JP | 07256673 A | * | 10/1995 |
| JP | 2520624 Y2 | | 12/1996 |
| JP | 2000-190345 A | | 7/2000 |
| JP | 2008-302535 A | | 12/2008 |
| JP | 2008302535 A | * | 12/2008 |
| JP | 2009-029066 A | | 2/2009 |

OTHER PUBLICATIONS

English translation of JP-2008302535-A by EPO. (Year: 2008).*
Extended European Search Report dated Jan. 2, 2010, Application No. EP 17 81 3056, 8 pages.
Indian Office Action with English text dated Jul. 21, 2020, 7 pages.
International Search Report, International Application No. PCT/JP2017/017893 dated Jun. 27, 2017, 2 pages.

* cited by examiner

FIG.5A
(Present Embodiment)

FIG.5B
(Present Embodiment)

| | | Comparative Example | Present Embodiment |
|---|---|---|---|
| Molding Conditions — Press Speed | mm/sec | Low 3 | High 24.6 |
| Vacuum Conditions — 1st Decompression Circuit | | Operated (After Contact) | Operated (Before Contact) |
| Vacuum Conditions — 2nd Decompression Circuit | | Operated | Operated |
| Molding Pressures | Mpa | 20 | 10 |
| Parallel Control Of Metal Mold | | Not Operated | Operated |
| Results — Presence Of Void In Molded Articles | | No Good | No Good |
| Average Plate Thicknesses | mm | 2.85 Thin | 2.8 Thin |

//  MOLDING METHOD AND MOLDING SYSTEM FOR RESIN MOLDED MEMBER

FIELD OF INVENTION

The present invention relates to a molding method and a molding system for molding a resin molded member.

BACKGROUND ART

Recently, highly demanded is a resin material having density lower than a steel plate and expectedly improving fuel efficiency via weight reduction to be applied to a part of a component of vehicle body for responding to regulations of reducing $CO_2$ emissions from vehicles. Particularly, a "method for press-molding resin" is known as a process for molding a large component of resin at a relatively low pressure to target a component of vehicle body. Such a representative process includes a process for a SMC (sheet molding compound) using a hydraulic machine (e.g., Patent Document 1). Further, another process is present using a thermoplastic stamping material (e.g., GMT (glass-mat reinforced thermoplastics) formed via using a thermoplastic resin needed no curing reaction (PP PA) as a matrix resin.

In many of the above materials, glass fibers are used as reinforced fibers, and the materials are used for a relatively thick plate due to a low elastic modulus thereof. Further, a low thermoconductivity thereof hardly cools the materials after pre-heated, causing a necessity for improving some of a mold-clamping speed of a conventional hydraulic press machine for SMC to mold the materials.

As described above, demands for weight reduction are greatly high, especially, via directed to a thermoplastic composite material (e.g., carbon fibers reinforced thermoplastic resin (CFRTP)) using carbon fibers (carbon) having lower density and higher elastic modulus than glass fibers. Thus, such distinguished physical properties allow the thermoplastic composite material to have a high potentiality for realizing the weight reduction.

However, a thermoplastic composite material in a state of relatively "thin plate" is needed to be used in order to realize the weight reduction by means of a high elastic modulus. Further, there is another issue that a high thermal conductivity allows easy cooling of the material. Therefore, a resin material in a heated and molten state should be subjected to high speed mold-cramping to be press-processed.

DOCUMENTS OF PRIOR ART

Patent Documents

Patent Document 1: Utility Model Registration No. 2520624

SUMMARY OF INVENTION

Problems to be Solved by Invention

Next, defects of a high speed mold-clamping process will be discussed.

When a metal mold device is driven in a high speed mold-clamping process, air in a cavity of the metal mold is not sufficiently removed out, resulting in remains of a lot of voids inside a molded article. This causes a defect of poor physical properties. For solving the defect, for example, use of a metal structure having a horizontal parting line enables improvement in air removal. However, such a metal mold having a horizontal parting line also allows a resin material to flow out to an outside of the cavity. Thus, this phenomenon may generate burrs at a periphery of the resin molded article and decrease productivity due to necessity of a post-trimming step of removing the burrs.

Next, a hydraulic press machine may be simply set to under a condition of high speed mold-clamping to perform the operation. However, actually the machine operation is switched to hydraulic control at an upside position of a press dead point, causing a movement speed of the metal mold to be low in lowering. Accordingly, when the upper mold contacts a resin material, a movement speed thereof is decreased to low, and the resin material is molded in a cooled state sandwiched between the metal molds for a relatively long-time. Such a cooling process prevents formation of a molded article from corresponding to a cavity shape as well as production thereof from having a thin plate thickness.

The defect of deteriorated moldability is caused by the process that a resin material in a molten and softened state is molded at a low temperature of the metal mold, which may fix a shape of the resin material. Such a temperature of the metal mold fixing the shape varies depending on a resin composition thus used. However, generally the temperature is in the range of about 100° C. 200° C. Further, shortening a molding cycle is desired in order to improve the producibility by means of decreasing a temperature of the mold as low as possible thereby to shorten a solidification time. A lower limit temperature thereof is set depending on an appearance of surface of a molded article.

An object of the present invention is to provide a molding method and a molding system for molding a resin molded member, which are capable of improving a molding speed of the resin molded member.

Means for Solving Problems

For realizing the above object, the present invention is directed to a method for molding a resin molded member by molding a thermoplastic resin composite material thus prepared by dispersing reinforced fibers in a thermoplastic resin composition, thereby to press-molding the composite material in a metal mold having an upper mold and a lower mold while decompressing an inside of the metal mold.

The molding method includes the steps of starting a mold-clamping process at a timing after the thermoplastic resin composite material is filled on the lower mold of the metal mold; and starting to decompress an inside of a cavity by a first decompression circuit as the mold-clamping process progresses, at a timing when the cavity is closed by a sealing member arranged on an engagement surface of the upper mold and/or the lower mold of the metal mold and before the thermoplastic resin composite material thus filled on the lower mold of the metal mold contacts the upper mold of the metal mold.

Further, the molding method includes the step of completing the mold-clamping process by starting to decompress the inside of the cavity by a second decompression circuit at a timing after the thermoplastic resin composite material thus filled on the lower mold contacts the upper mold of the metal mold, as the mol-clamping process further progresses.

According to the present invention, a first decompression circuit starts to decompress an inside of a cavity at a timing when the cavity is closed by a sealing member and before a thermoplastic resin composite material thus filled in the metal mold contacts another metal mold. Then, a second decompression circuit starts to decompress the inside of the cavity at a timing after the thermoplastic resin composite material thus filled in the metal mold contacts another metal mold, whereby the mold-clamping process is completed. In the present invention, use of the above described molding method may improve not only flowability of the thermoplastic resin composition containing carbon fibers but also moldability thereof. As a result, in the present invention, it is possible to improve a molding speed (or a press speed) while avoiding any formation of burrs. Note, preferably the reinforced fibers (e.g., carbon fibers) are oriented in a random direction.

Further, in the present invention, the reinforced fibers include a carbon fiber having a fiber length of 5 mm or more and 50 mm or the less.

According to the present invention, elasticity of the carbon fiber having a fiber length of 5 mm or more and 50 mm or the less enables a thermoplastic resin composite material in a porous and foaming body state with a cushion shape containing a large amount of air to be press-molded in the metal mold while preferably decompressing.

Moreover, in the present invention, the molding system includes a metal mold having an upper mold and a lower mold arranged so that both the molds can be relatively approachable and separable each other, and configured of at least a vertical parting line structure; a decompression circuit including at least two or more lines of passages connected to a cavity of the metal mold; a switching valve switching the passages of the decompression circuit; and a sealing member keeping airtightness inside the cavity of the metal mold.

Furthermore, in the molding method, a mold-clamping process operated under speed control and a mold-clamping process operated under pressure control which is subsequently performed following the former process are carried out respectively, after the sealing member is engaged between the upper and lower molds. Herein, it should be noted that a mold-clamping speed operated under the speed control is faster than a mold-clamping speed operated under the pressure control.

According to the present invention, the sealing member may keep the airtightness inside a cavity in a metal mold thus configured of a vertical parting line structure. Further, a decompression circuit may preferably degas air present inside the cavity of the metal mold and inside a resin material by vacuuming the cavity and material. Moreover, a mold-clamping process operated under the speed control is conducted after the sealing member is engaged between the upper and lower molds, and subsequently a mold-clamping process operated under the pressure control is conducted. The method thus described above may realize speed-up of a total of the mold-clamping process.

Effect of Invention

According to the present invention, a molding method and a molding system for molding a resin molded member and capable of improving a molding speed of the resin molded member may be realized.

EMBODIMENTS FOR CARRYING OUT INVENTION

Figure 1:
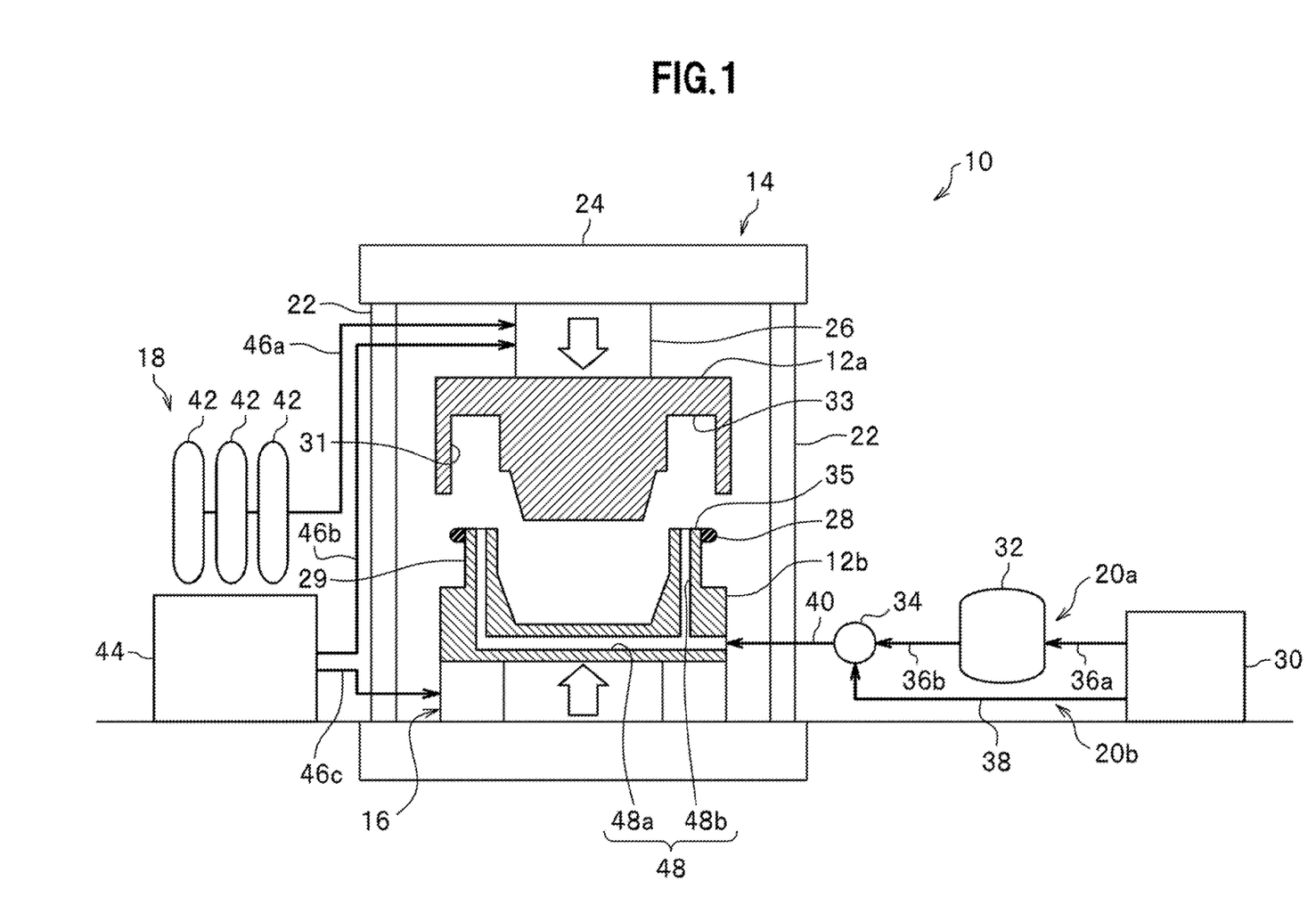
FIG. 1 is a structural block diagram of a molding press system conducting a method for molding a resin molded member in an embodiment of the present invention.

Hereinafter, an embodiment of the present invention will be described in detail via appropriately referring to the attached drawings. FIG. 1 is a structural block diagram of a molding press system which carries out a method for molding a resin molded member in an embodiment of the present invention.

As shown in FIG. 1, a molding press system (i.e., a molding system) 10 is configured to include a press machine 14 having an upper mold 12a and a lower mold 12b capable of relatively displaceable, a device controlling mold parallel movement 16, a mold-clamping drive device 18, and two lines configured of a first decompression circuit (i.e., a decompression circuit) 20a and a second decompression circuit (i.e., a decompression circuit) 20b.

The press machine 14 includes a movable upper mold 12a, a fixed lower mold 12b and a support member 24 supported by a plurality of legs 22. Further, the press machine 14 is hung by the support member 24 and additionally includes a hydraulic cylinder 26 that liftably moves the upper mold 12a along the virtual direction, and a ring shaped sealing member (i.e., a packing) 28 attached to a parting surface (i.e., a vertical parting surface) between the upper mold 12a and the lower mold 12b.

Note, in the present embodiment, the sealing member 28 is arranged on the lower mold 12b. However, the arrangement is not limited to the above embodiment. For example, the sealing member 28 may be arranged on the upper mold 12a, or the sealing members 28 may be arranged both on the upper mold 12a and on the lower mold 12b, respectively.

In the present embodiment, the sealing member 28 is attached to a reduced-diameter outer peripheral surface 29 located at a top end of the lower mold 12b. The sealing member 28 attached to the reduced-diameter outer peripheral surface 29 located at a top end of the lower mold 12b exerts a sealing function when the sealing member 28 slides along an annular inner diameter surface 31 of the upper mold 12a during the mold-clamping process. Herein, engagement of the annular inner diameter surface 31 of the upper mold 12a with the sealing member 28 forms an annular space 37 closed by an annular recess 33 of the upper mold 12a, the sealing member 28 and a top end surface 35 of the lower mold 12b (see FIGS. 5A and 5B). The annular space 37 is vacuumed through a second suction passage 48b as described hereinafter. Note, the vertical parting surface is configured of the annular inner diameter surface 31 of the upper mold 12a and the reduced-diameter outer peripheral surface 29 of the lower mold 12b.

The first decompression circuit 20a includes a vacuum pump 30, a vacuum tank 32, a switching valve 34, a first communication passage 36a communicating the vacuum pump 30 to the vacuum tank 32 and a second communication passage 36b communicating the vacuum pump 30 to the switching valve 34. The second decompression circuit 20b includes the vacuum pump 30 and a communication passage directly communicating the vacuum pump 30 to the switching valve 34. The switching valve 34 is communicated to the lower mold 12b through a passage 40.

A suction passage 48 communicating with the passage 40 to vacuum the inside of the metal mold is formed inside the lower mold 12b. The suction passage 48 is configured of a first suction passage 48a horizontally extended along a bottom of the lower mold 12b, and a second suction passage 48b branching off from the first suction passage 48a to rise toward a vertical direction and penetrate to a top end surface 35 of the lower mold 12b.

Here, in the present embodiment, the decompression circuit is described using the first decompression circuit 20a and the second decompression circuit 20b. However, the present embodiment is not limited to the above configuration. The present embodiment may include a decompression circuit provided with at least two or more lines of passages.

The device controlling mold parallel movement 16 is attached to the lower mold 12b and configured of, for example, a plurality of hydraulic actuators (not shown) to keep the lower mold 12b in parallel or substantially parallel to the upper mold 12a.

The mold-clamping drive device 18 includes a plurality of accumulators 42 and a hydraulic pump 44. Each of the accumulators is connected to a hydraulic cylinder 26 through a first hydraulic passage 46a. Further, the hydraulic pump 44 is connected to the hydraulic cylinder 26 through a second hydraulic passage 46b, and further connected to a device controlling mold parallel movement 16 through a third hydraulic passage 46c.

The molding press system 10 carrying out the method for molding the resin molded member of the present embodiment is basically configured as described hereinbefore. Next, effects exerted by the system 10 will be described specifically.

Figure 2:
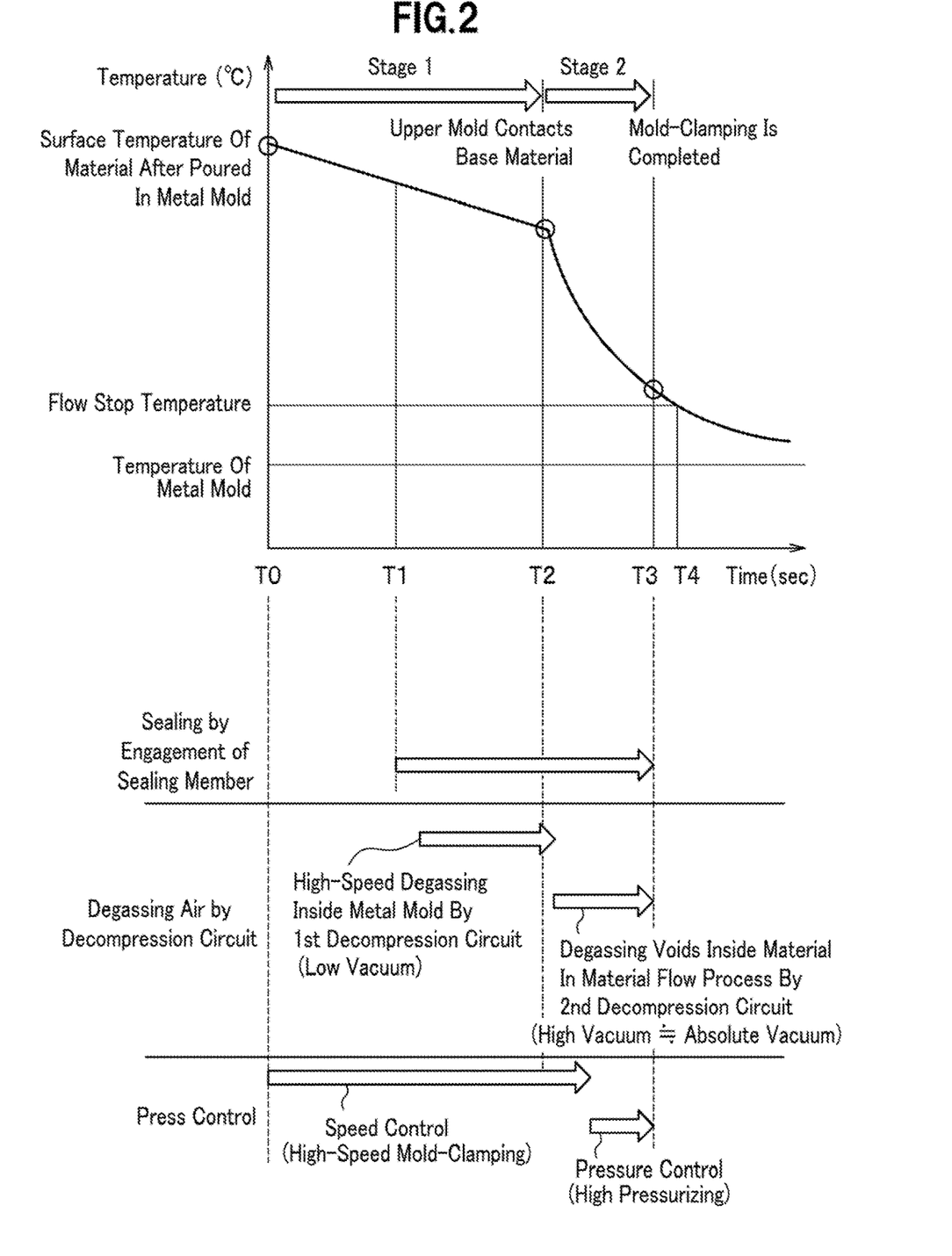
FIG. 2 is a process chart showing a mold-clamping process of a press machine.

FIG. 2 is a process flowchart showing a mold-clamping process of the press machine. In FIG. 2, the horizontal axis represents a time (sec) and the vertical axis represents a temperature (° C.), respectively. Here, each of the times T0~T4 in the horizontal axis represents as follows.

T0: representing a time when a resin material (or a base material) is poured on the lower mold 12b.

T1: representing a time when the sealing member 28 attached to the lower mold 12b engages the upper mold 12a so that the cavity becomes a sealed space. After the time T1, vacuum degassing may be conducted.

T2: representing a time when the upper mold 12a contacts the base material. After the time T2, a temperature of the resin material is rapidly lowered.

T3: representing a time when the press machine 14 completes the mold-clamping process (i.e., when the upper mold 12a goes down to the press dead point.). A temperature of the resin material at that time should be equal to or higher than the flow stop temperature. That is, if the time T3 is not earlier than the time T4 representing a time when a flow of the resin material stops, a desired molded member cannot be obtained.

T4: representing a time when a flow of the resin material stops.

Further, "temperatures" in FIG. 2 include a surface temperature of the material after poured on the metal mold at the time T0, and a flow stop temperature at the time T4.

In the mold-clamping operation performed by the press machine 14, the resin material in a molten and softened state is cooled to be solidified as a time passes. If such a time when the material is cooled to be solidified is defined as a "flow stop temperature", the flow stop temperature is determined by a composition of the resin material (i.e., physical constants: specific heat capacity, thermal conductivity, density and a thickness, etc.).

In the present embodiment, the thermoplastic resin composite material is expected to be used for a vehicle component member. Such a vehicle component member includes, for example, a panel member, and a main frame member such as a side sill, a center pillar and a floor cross member. Note, the application of the thermoplastic resin composite material of the present embodiment is not limited to those vehicle component members. The thermoplastic resin composite material of the present embodiment may be applied to a component member used for a movable body such as a ship and an aircraft besides a vehicle, and further to a component member such as a building and various instrument devices.

A thermoplastic resin serving as the resin material of the present embodiment includes, for example, a crystalline resin such as high density polyethylene, low density polyethylene, polypropylene, a polyamide resin, polyacetal, polyethylene terephthalate, polybutylene terephthalate, polyphenylene sulfide, polyether ether ketone; and an amorphous resin such as polystyrene, polyvinyl chloride, an AS resin, an ABS resin, an acryl resin, polycarbonate, and modified polyphenylene ether or the like. However, the present embodiment is not limited to those resins.

Relationships between a mold-clamping time and a surface temperature of the resin material thus poured inside the cavity of the metal mold are classified into two stages consisting of Stage (T0→T2) that is a stage before the upper mold 12a contacts the base material, and Stage 2 (T2→T3) that is a stage after the upper mold 12a contacts the base material.

A cooling speed of a surface of the resin material at Stage is about −2° C./sec. On the contrary, a cooling speed of a surface of the resin material at Stage 2 is about −20° C./sec.

As mentioned above, in the molding process involving a flow of the resin material inside the cavity of the metal mold, particularly important is Stage 2. That is, a plate thickness and a degree of freedom in shape of the resin molded member are determined depending on how much time can be reduced to be required for completing the mold-clamping process of the metal mold after the resin material contacts the upper metal mold 12a.

Figure 3A:
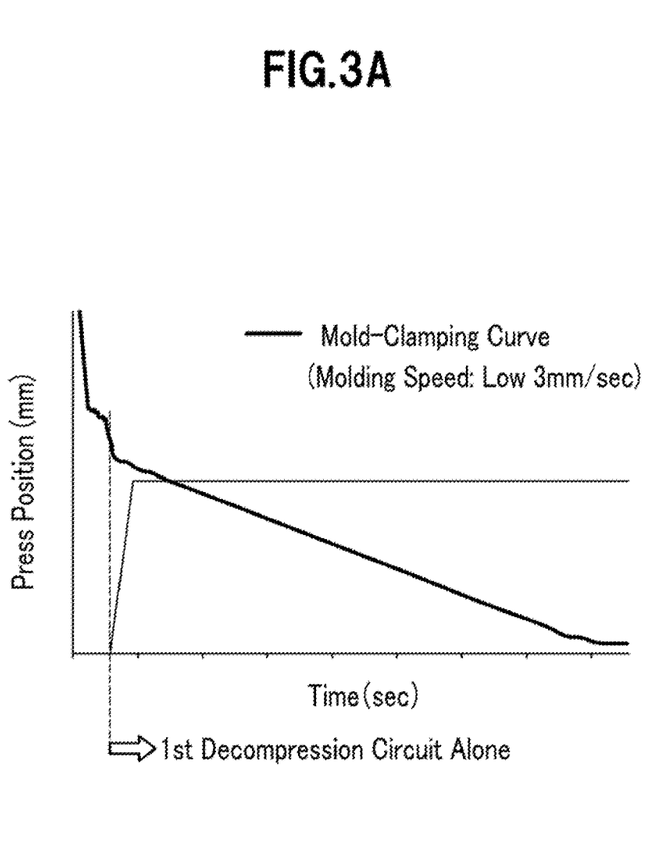
FIG. 3A is a characteristic diagram showing a relationship between a time and a press position in lowering operation of an upper mold of the press machine in case of using only a first decompression circuit.
Figure 3B:
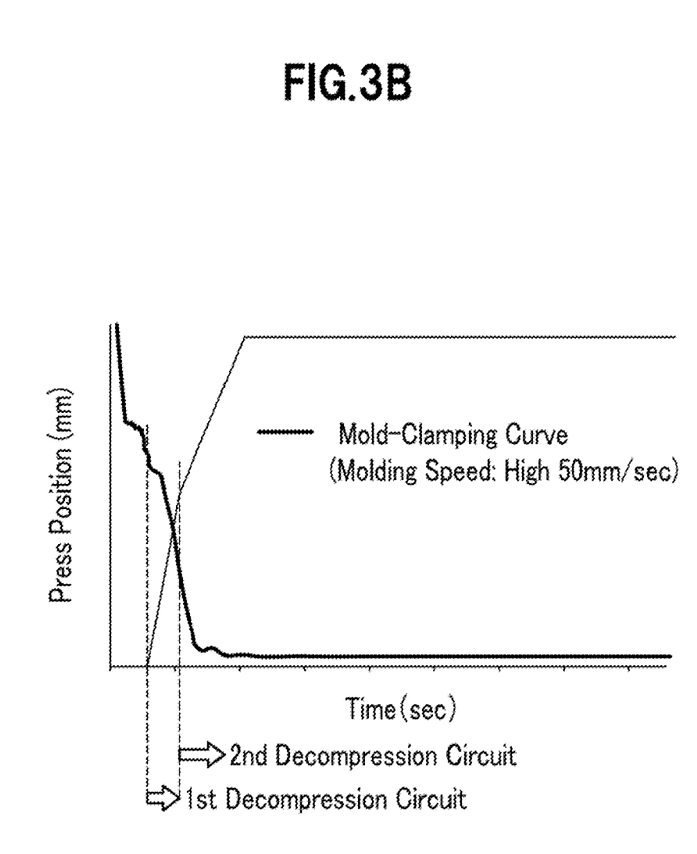
FIG. 3B is a characteristic diagram showing a relationship between a time and a press position in lowering operation of an upper mold of the press machine in case of using both first and second decompression circuits.

FIG. 3A is a characteristic diagram showing a relationship between a press position and a time in lowering operation of the upper mold of the press machine, thus performed by using the first decompression circuit alone. FIG. 3B is a characteristic diagram showing a relationship between a press position and a time in lowering operation of the upper mold of the press machine, thus performed by using both the first decompression circuit and the second decompression circuit in combination.

An SMC material and a GTM material used in the prior art do not contain a large amount of air inside the materials at the stage when the materials are poured in a metal mold. Thus, a negative pressure for vacuuming an inside of the cavity is not so high. Further, a lowering time of the upper mold to the press dead point is not set to so short because the materials are hardly cooled during the molding process. Accordingly, in the prior art, the decompression circuit can conduct a decompression process using only the first decompression circuit 20a provided with the vacuum tank 32 beforehand kept at a desired negative pressure (see FIG. 3A). Herein, generally the decompression circuit is connected to a fixed type of the lower mold 12b. Note, a timing of starting the decompression process is set to a time when the upper mold 12a contacts the sealing material 28 of the lower mold 12b to engage therewith (i.e., when the sealing function is exerted).

On the contrary, in the present embodiment, the resin material contains carbon fibers in random (i.e., carbon fibers being randomly orientated), which results in necessity for completing the mold-clamping process in a short time before the resin material is cooled. In short, required is to get a negative pressure condition in a short time. Therefore, in the present embodiment, the first decompression circuit is required to be driven even at Stage 1 as shown in FIG. 2.

Note, a material kneaded and plasticized by an injection molding machine (e.g., a material of long fiber pulette) has a short fiber length and does not contain a large amount of air inside the material at a stage when the material is poured in the metal mold. Thus, such a material is excluded from the resin material of the present embodiment. In the present embodiment, a time for plasticizing and mixing a resin material by an injection molding machine is unnecessary. This advantageous feature of the present embodiment enables a high-speed resin molding process, for example, allowing a molding process of 1~4 shot/2 mim.

A resin material targeted in the present embodiment is in a molten and softened state at a stage when the resin material is poured in the metal mold. Herein, carbon fibers in the resin material are randomly dispersed with a fiber length of at least 5 mm or more and 50 mm or less. The resin material of the present embodiment is in a porous and foaming body state with a cushion shape containing a large amount of air due to elasticity of the carbon fibers. The resin material has density of 1.25~1.4 g/cm$^3$ in the sate of composite containing no air (i.e., a molded article thus completed). On the contrary, at a sage when the resin material is poured in the metal mold, the resin material has density of about 0.25 g/cm$^3$, and is in the state containing an about 5-fold large amount of air. Thus, such a resin material is required to be degassed with a high negative pressure.

For securing the high negative pressure, in the present embodiment, at a timing of starting negative pressure operation, the first decompression circuit 20a provided with the vacuum tank 32 beforehand kept at a desired negative pressure is driven to preliminary vacuum an inside of the metal mold. Further, at the timing of starting the negative pressure operation, the vacuum tank 32 and the vacuum pump 30 are simultaneously driven to conduct a degassing process by a high negative pressure (i.e., a low vacuum). Then, after reaching the time T2, the first decompression circuit 20a is switched to the second decompression circuit 20b by the switching valve 34, thereby achieving a high negative pressure (i.e., a high vacuum) in a short time.

For example, in Patent Document 1 of the prior art, a decompression circuit configured of two lines is provided. Patent Document 1 discloses that a negative pressure of a first decompression circuit is low at a level of –0.01 MPa, and subsequently the first decompression circuit is switched to a second decompression circuit to achieve a high vacuum pressure. Here, the term of a "vacuum pressure" means a negative pressure when the atmospheric pressure is defined as 0, and referred to as a so-called "gauge pressure".

Herein, it should be noted that Patent Document 1 does not teach nor suggest any of concrete specifications and applicability to a molding cycle time. Further, according to Patent Document 1, it is not clear whether or not a resin material of Patent Document is applicable to the resin material targeted in the present embodiment in which the resin material is in a molten and softened state at a stage when the resin material is poured in the metal mold, carbon fibers are randomly dispersed, and a fiber length thereof is at least 5 mm or more and 50 mm or less.

In the present embodiment, when described using a gauge pressure, preferably a negative pressure of the first decompression circuit 20a is set to, for example, in the range of –0.04~–0.07 MPa (i.e., a low vacuum). Here, a negative pressure lower than the range is difficult to sufficiently degas the air inside the resin material. On the contrary, if the negative pressure is set to higher than the range, a volume of the vacuum tank 32 is needed to be equal to or more than 200 L, making it difficult to recover the negative pressure against such a large volume again to a level of –0.1 MPa within an interval of molding cycles. Accordingly, continuous molding cycles cannot be realized.

Further, preferably a negative pressure of the second decompression circuit 20b is set to about –0.07~–0.1 Mpa (i.e., high vacuum absolute vacuum). The second decompression circuit 20b may be configured to include, for example, a vacuum pump and a plurality of vacuum tanks, and gradually switched therebetween. In that case, such operation may be appropriately set depending on a desired negative pressure and an in-site space. Moreover, a high vacuum pressure may remove a gas component thus generated via deterioration of the resin in a molten and softened sate, leading to an advantage of improving strength in physical properties of the resin material. Here, as shown in FIG. 3B, in the present embodiment, both the first decompression circuit 20a and the second decompression circuit 20b are used in combination, and the first decompression circuit 20a is switched to the second decompression circuit 20b. This operation may increase the molding speed to make a mold-clamping curve suddenly fall down.

Figure 4A:
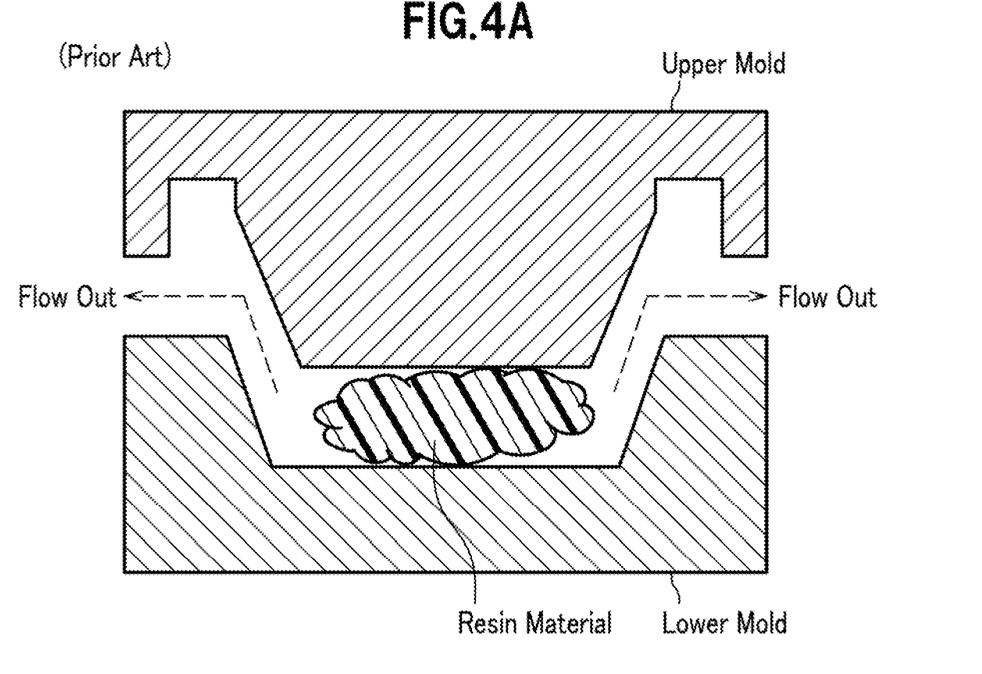
FIG. 4A is a schematic diagram showing a mold-clamping process of a metal mold in the prior art.
Figure 4B:
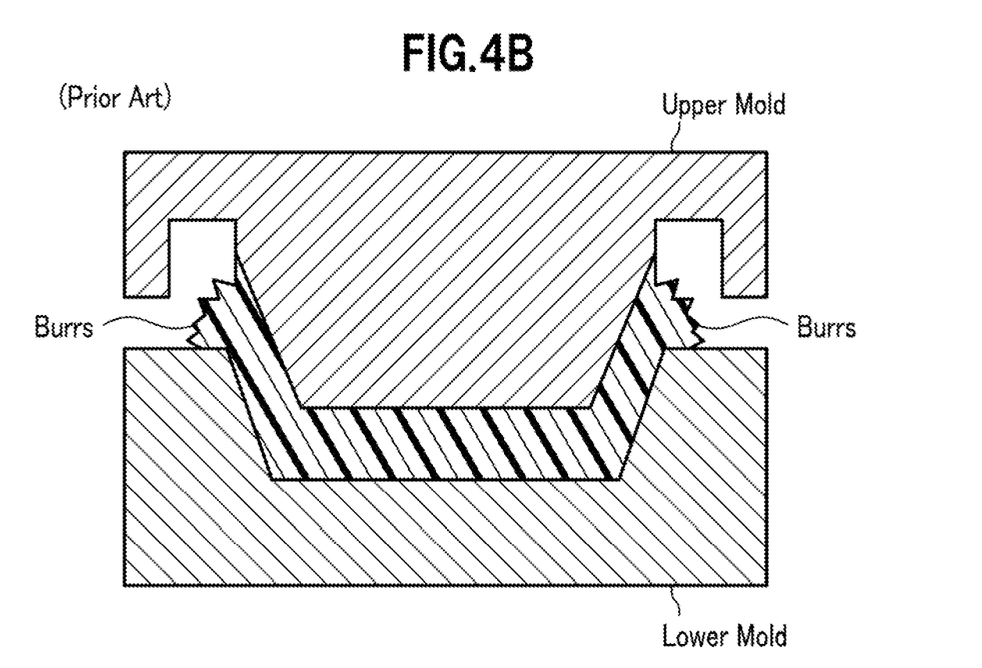
FIG. 4B is a schematic diagram showing a stage when the mold-clamping process of FIG. 4A is completed.
Figure 5A:
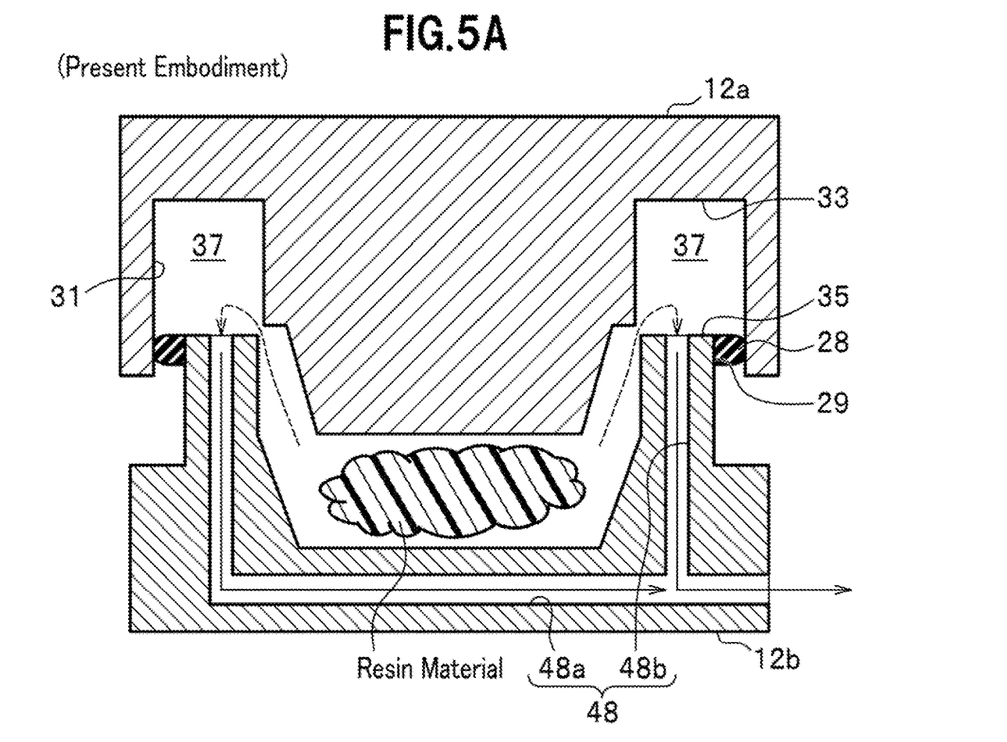
FIG. 5A is a schematic diagram showing a mold-clamping process of a metal mold in an embodiment of the present invention.
Figure 5B:
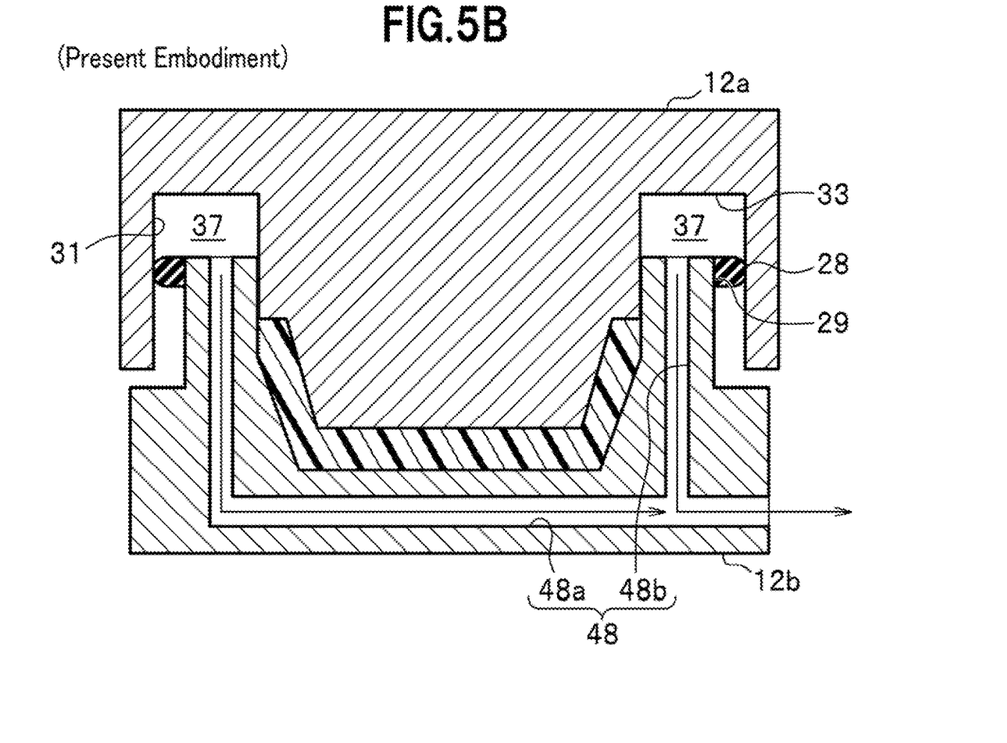
FIG. 5B is a schematic diagram showing a stage when the mold-clamping process of FIG. 5A is completed.

FIG. 4A is a schematic diagram showing a mold-clamping process of a metal mold in the prior art. FIG. 4B is a schematic diagram showing a stage when the mold-clamping process of FIG. 4A is completed. FIG. 5A is a schematic diagram showing a mold-clamping process of a metal mold in an embodiment of the present invention. FIG. 5B is a schematic diagram showing a stage when the mold-clamping process of FIG. 5A is completed.

In the prior art, a method for continuously degassing air to an outside of the metal mold until completion of the mold-clamping process includes use of horizontal partition (i.e., a horizontal parting line). Herein, a partition surface dividing the upper and lower molds is set in the direction of crossing the mold-clamping direction. In this prior art, an inside of the cavity of the metal mold is communicated to an outside thereof so as to make the inside of the cavity opened to the atmosphere. This structural feature causes a defect that a resin material flowing out along a horizontal parting line is left as burrs. Further, in the prior art, for example, when a resin material is in a cushion shape to contain a large amount of air inside the material, it is difficult to remove the air thus contained therein.

In contrast, according to the present embodiment, as shown in FIGS. 5A and 5B, a sealing member 28 is arranged on a vertical partition surface between the upper mold 12a and the lower mold 12b. This structural feature may keep airtightness inside the cavity of the metal mold, thereby to securely degas air by a negative pressure generated by the first and second decompression circuits 20a and 20b. Further, in the present embodiment, the partition surface of the metal mold is made as vertical partition (i.e., a vertical parting line). Herein, the partition surface is set in the direction parallel or substantially parallel to the direction of the mold-clamping direction. This structural feature allows rapid completion of the mold-clamping process while avoiding a flowable resin material from flowing out to the outside of the metal mold.

Here, a timing of fitting in a profile is a "time T1" at Stage 1, and at that time the upper mold 12a engages the sealing member 28 before the vertical parting line is engaged, allowing a closed space for effectively degassing the inside of the cavity of the metal mold to be secured.

At that time, driving the first decompression circuit 20a makes the inside of the cavity of the metal mold in a low vacuum state, in which a high-speed degassing process can be executed. Then, driving the second decompression circuit 20b generates a high vacuum state, in which voids inside the material can be degassed during a flowing process of the resin material. Note, the first and second decompression circuits 20a and 20b are made to be switched based on a switching signal outputted from a controller (not shown) to the switching valve 34.

Figure 6A:
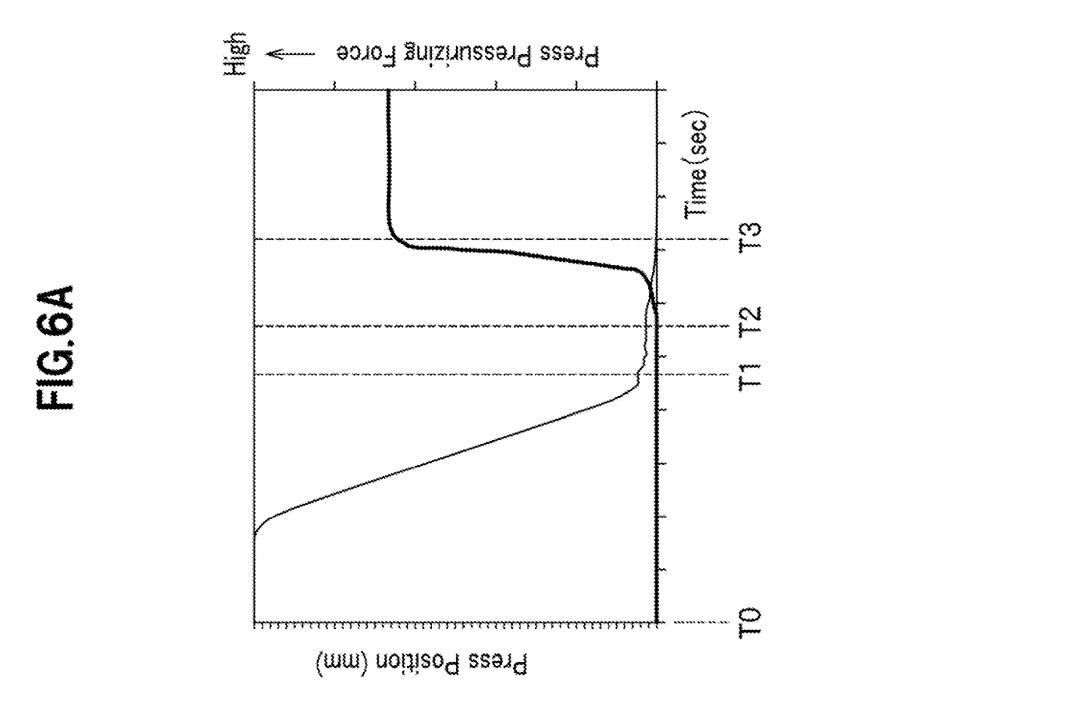
FIG. 6A is a characteristic diagram showing a relationship between a press lowering time, a press position and a press pressure of the upper mold in the present embodiment.
Figure 6B:
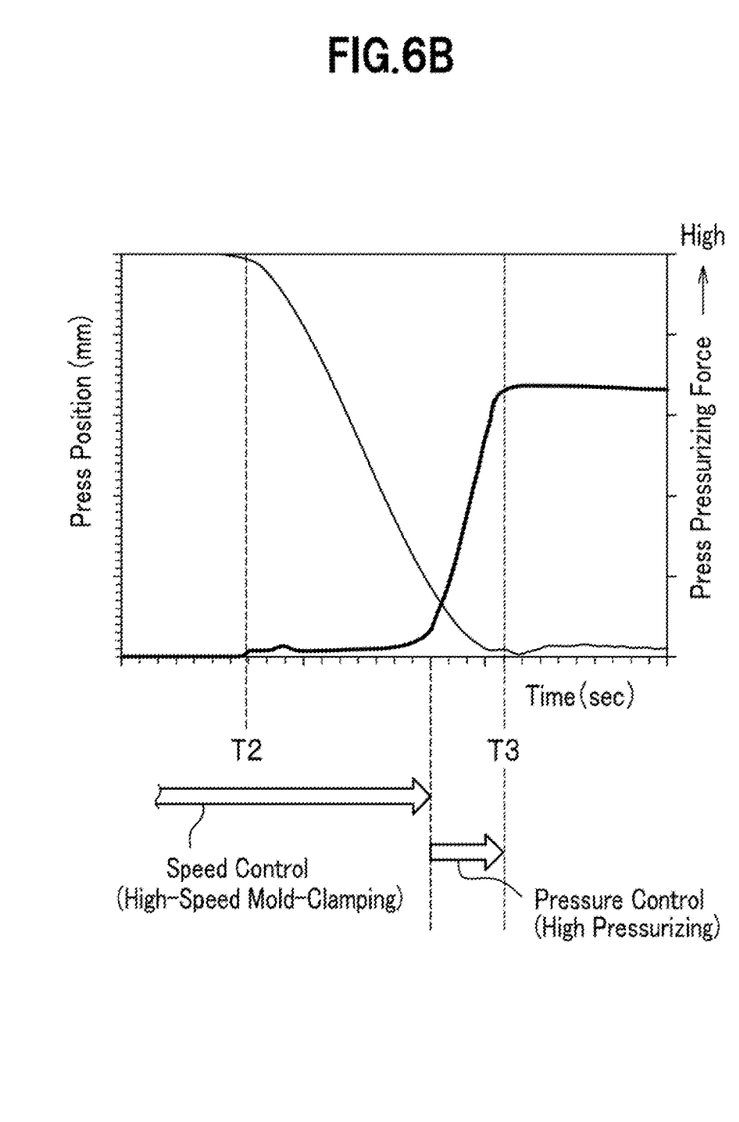
FIG. 6B is a partially enlarged characteristic diagram showing an region from a time T2 to a time T3 of FIG. 6A.

FIG. 6A is a characteristic diagram showing a relationship between a press lowering time, a press position and a press pressure of the upper mold in the present embodiment. FIG. 6B is a partially enlarged characteristic diagram showing a region from a time T2 to a time T3 of FIG. 6A.

Reduction of time (i.e., speed acceleration) from a time T0 to a time T1 (i.e., a time when the upper mold 12a engages the sealing member 28) depends on a structure of the press machine 14. For example, such a structure may assist the lowering speed of the upper mold 12a via the respective accumulators 42, and raise the free fall. A mold-clamping speed at that stage is about 500~1500 mm/sec. Further, the lowering speed of the upper mold 12a is needed to be reduced before reaching the time T1 in order to decrease loads of sliding and deformation to the sealing member 28 of the upper mold 12a and prevent damage thereof.

As mentioned hereinbefore, in the molding process of the resin material of the present embodiment, essential is speed acceleration (i.e., reduction of time) at Stage 2 in which a cooling speed of the resin material is high due to a sandwiched state of the material between the metal molds. Therefore, operation carried out after the time T1 will be described more specifically below (see FIGS. 6A and 6B).

After the time T1 has passed, the metal molds (i.e., the upper mold 12a and lower mold 12b) of the press machine 14 will reach an engagement state in which the vertical parting line is engaged. The vertical parting line prevents the resin material thus poured in the cavity from flowing out to the external side, and a predetermined clearance is formed between the upper and lower molds 12a and 12b. The clearance is set to, for example, equal to or less than 0.05 mm. Here, switching to speed control using the device controlling mold parallel movement 16 is needed at an interval between the time T1 and the time T2 for preventing damage of the metal molds.

Conventionally, after the time T2 has passed, the mold-clamping process is controlled by pressure control. However, in the present embodiment, speed control using the device controlling mold parallel movement 16 is preferable even after the time T2 has passed (see FIGS. 2 and 6B). In the present embodiment, a timing of switching the speed control to the pressure control should be delayed as long as possible. This delay is effective for reducing time at Stage 2. Namely, the pressure control controls press pressurizing force onto the metal mold, so that the mold-clamping speed takes its "course" thereby to need a time letting the resin fail to reproduce the flowability.

Note, a mold-clamping speed operated by the speed control is preferably higher than a mold-clamping seed operated by the pressure control. As shown in FIG. 6B, for example, preferably the speed control is switched to the pressure control via detecting a rise of the press pressurizing force.

However, it is difficult to pressurize the resin material simply by the speed control after the time T2, thereby causing a defect. As shown in a partially enlarged graph of FIG. 6B, the lowering speed of the upper mold 12a decreases due to elastic repulsive force of the resin material after the time T2. Thus, the upper mold 12a fails to follow the mol-clamping speed operated by the device controlling mold parallel movement 16, raising a difficulty in keeping a parallel condition of the metal mold. For example, those defects may result in damage of the metal mold and malfunction in the press machine 14.

Further, preferably a lowering speed of the upper mold 12a after the time T2 is set by a size of the resin material thus filled in the cavity.

Moreover, the first decompression circuit 20a is switched to the second decompression circuit 20b via the switching valve 34 after the time T2 has passed so as to degas the inside of the cavity of the metal mold.

Figure 7:
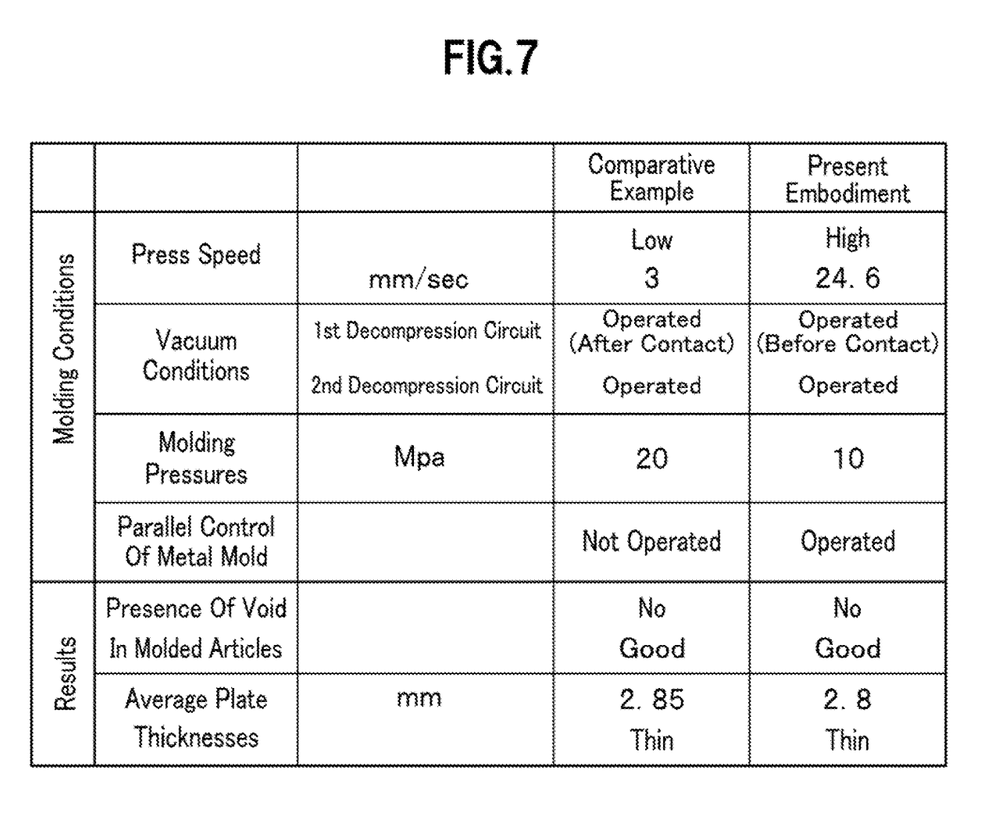
FIG. 7 is a table showing molding conditions and results listed by comparing Present Embodiment and Comparative Example.

FIG. 7 is an explanatory diagram showing molding conditions and results listed by comparing Present Embodiment to Comparative Example. The molding conditions include a press speed (i.e., a press molding speed) (mm/sec), decompression conditions (i.e., operation and non-operation of the first and second decompression circuits), a molding pressure (MPa), and operation and non-operation of parallel control of the metal mold. Further, the results therebetween are compared by presence of voids in the molded article and an average plate thickness (mm).

In Comparative Example, the press speed was 3 (mm/sec), both the first and second compression circuits 20a and 20b were operated respectively under the decompression conditions, and the molding pressure was 20 (MPa). Here, it should be noted that in Comparative Example, the first decompression circuit 20a was operated at a stage after the upper mold 12a of the metal mold had contacted the resin material thus poured in the cavity.

In Present Embodiment, the press speed was 24.6 (mm/sec), both the first and second compression circuits 20a and 20b were operated respectively under the decompression conditions, and the molding pressure was 10 (MPa). Here, it should be noted that in Present Embodiment, the first decompression circuit 20a was operated at a stage before the upper mold 12a of the metal mold had contacted the resin material thus poured in the cavity.

Accordingly, in Present Embodiment and Comparative Example, voids were not generated in molded articles, and the average plate thicknesses were 2.85 mm (Comparative Example) and 2.8 mm (Present Embodiment), respectively. Therefore, in both cases, the molded articles were produced with relatively thin thicknesses in common.

However, in Comparative Example the press speed was very low showing only 3 (mm/sec), whereas in Present Embodiment the press speed was 24.6 (mm/sec) which was 8-fold higher than that in Comparative Example, resulting in improvement of the molding speed. As mentioned above, Present Embodiment accomplished the improvement in the press speed (i.e., the molding speed) to mold the resin molded member while avoiding generation of burrs.

DESCRIPTION OF REFERENCE NUMBERS

10 Molding Press System (i.e., Molding System)
12a Upper Mold (i.e., Metal Mold)
12b Lower Mold (i.e., Metal Mold)
14 Press Machine
20a First Decompression Circuit (i.e., Decompression Circuit)
20b Second Decompression Circuit (i.e., Decompression Circuit)
28 Sealing Member
34 Switching Valve

The invention claimed is:

1. A method for molding a resin molded member by press-molding a thermoplastic resin composite material, prepared by dispersing reinforced fibers in a thermoplastic resin composition, in a metal mold having an upper mold and a lower mold while decompressing an inside of the metal mold, the method comprising the steps of:
starting a mold-clamping process at a timing after the thermoplastic resin composite material is filled on the lower mold of the metal mold;
starting to decompress an inside of a cavity to a first vacuum state by a first decompression circuit at a timing when the cavity is closed by a sealing member arranged on an engagement surface of the upper mold and/or the lower mold of the metal mold as the mold-clamping process progresses and before the thermoplastic resin composite material thus filled on the lower mold of the metal mold contacts the upper mold of the metal mold; and
completing the mold-clamping process via starting to decompress the inside of the cavity to a second vacuum state, which is a higher vacuum state than the first vacuum state, by a second decompression circuit at a timing after the thermoplastic resin composite material thus filled on the lower mold contacts the upper mold of the metal mold as the mold-clamping process further progresses.

2. The method for molding a resin molded member described in claim 1, wherein the reinforced fibers are randomly oriented.

3. The method for molding a resin molded member described in claim 1, wherein the reinforced fibers comprise carbon fibers each of which has a fiber length of 5 mm or more and 50 mm or less.

4. A system for molding a resin molded member, the system comprising:
a metal mold including an upper mold and a lower mold both of which are arranged in a mutually and relatively approachable and separable manner and configured of at least a vertical parting line structure;
a first decompression circuit, configured to generate a first vacuum state, connected to a cavity of the metal mold;
a second decompression circuit, configured to generate a second vacuum state, which is a higher vacuum state than the first vacuum state, connected to the cavity of the metal mold;
a switching valve for switching between the first decompression circuit and the second decompression circuit;
a controller configured to control the switching valve so that it switches from the first decompression circuit to the second decompression circuit at a timing after the resin molded member filled on the lower mold of the metal mold contacts the upper mold of the metal mold; and
a sealing member keeping airtightness inside the cavity of the metal mold, wherein
the system is configured to carry out a mold-clamping process operated by speed control and subsequently a mold-clamping process operated by pressure control, after the sealing member is engaged between the upper mold and the lower mold, and
a mold-clamping speed, operated by the speed control, is higher than a mold-clamping speed, operated by the pressure control.

* * * * *